P. Higdon,
Elevator,
No. 70,565. Patented Nov. 5, 1867.
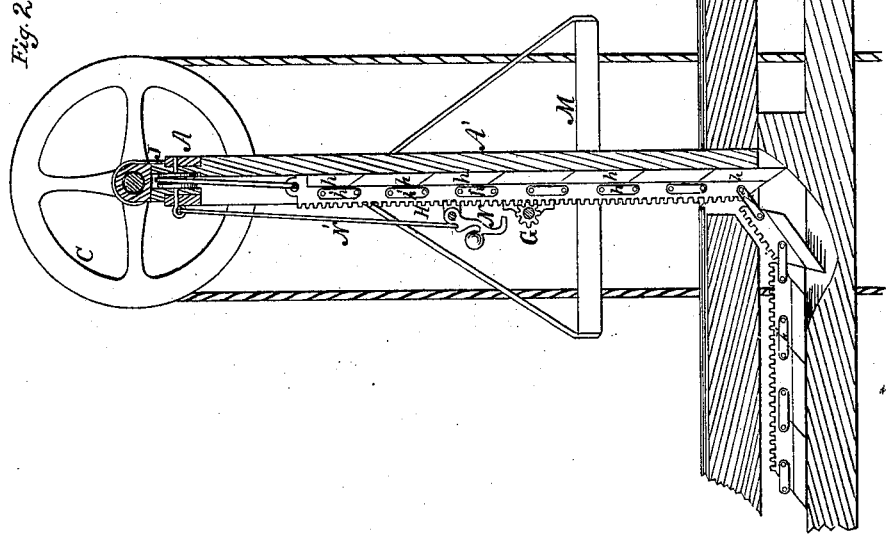
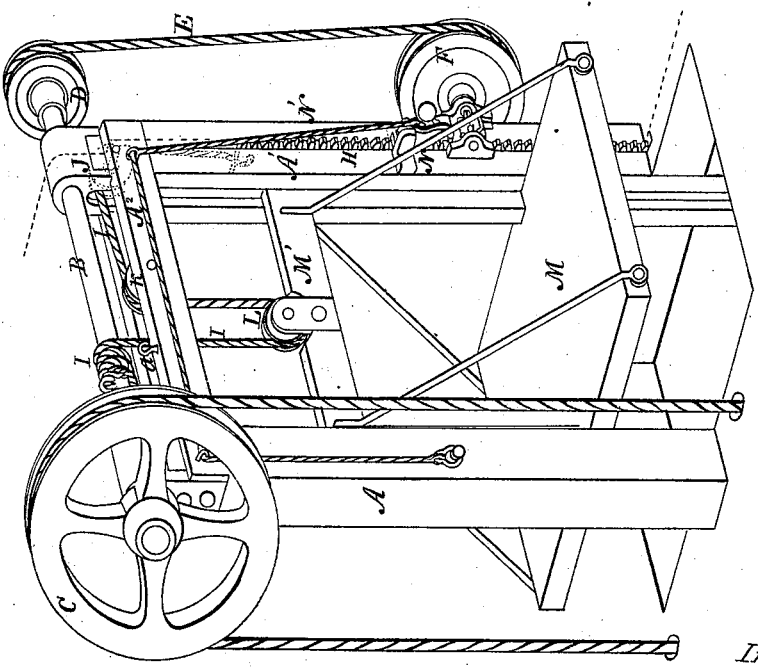
Witnesses
H. M. Bowen.
James. Chinn.
Inventor
Philip. Higdon

United States Patent Office.

PHILIP HIGDON, OF LEWISPORT, KENTUCKY.

Letters Patent No. 70,565, dated November 5, 1867.

---

IMPROVEMENT IN HOISTING APPARATUS.

---

The Schedule referred to in these Letters Patent and making part of the same.

---

TO ALL WHOM IT MAY CONCERN:

Be it known that I, PHILIP HIGDON, of Lewisport, Hancock county, State of Kentucky, have invented a new and improved Hoisting Apparatus; and I do hereby declare that the following is a full, clear, and exact description thereof, which will enable others skilled in the art to make and use the same, reference being had to the accompanying drawing, forming part of this specification.

This apparatus is designed for use in warehouses and mercantile establishments generally, as well as in the erection of buildings, and, in fact, under all circumstances where mechanical agencies may be brought into requisition for supplying the requisite power to elevate goods, materials, etc.

The invention consists in the employment of a rack, to which the elevating-cord or rope is attached, said rack traversing a vertical guide-way, and deriving its motion from a rotary shaft through the medium of a pinion and pulleys; the whole being constructed and arranged in such a manner as to facilitate the work and conduce to convenience, compactness, and economy of available power.

Figure 1 is a perspective view of a hoisting apparatus illustrating my invention.

Figure 2 is a sectional elevation of the same, showing the construction and mode of operating the sectional rack hereinafter referred to.

Similar letters of reference indicate corresponding parts in the two figures.

In the drawings, A $A^1$ represent the two uprights, which may be planted in a suitable base, and upon which is journalled the shaft B. The shaft B is to be rotated by hand, by means of a rope passing over the large pulley C on one end of the shaft B. Any other means for rotating the shaft C may be employed. D is a pulley mounted upon the opposite end of the shaft B, and driving the cord E through which motion is transmitted to the pulley F. The short shaft of the pulley F is supported in bearings fixed to the upright $A^1$, and said shaft is provided with a pinion, G, which engages with the teeth of a rack, H. This rack (see fig. 2) is made of a number of cogged-sections, $h$, which are connected together by links, $h^1$, and the rack is fitted within a suitable guide-way in the upright $A^1$, which it traverses vertically when in operation. The pinion G has a diameter, very small (say four inches in a working machine) in comparison with that of the pulley F from which it derives motion, and hence the power applied to the rack H very greatly exceeds that which is first imparted to the shaft B to put the apparatus in motion. In accordance with the use for which the apparatus is intended, or the weight to be lifted, the pinion G is to be made proportionately smaller in diameter, in order to equalize capacity and duties. I is the elevating-rope, which is fastened to the upper end of the rack H, and thence passed over pulleys J K, journalled respectively in the upright $A^1$ and cross-bar or tie-beam $A^2$. The rope I takes a downward direction from the pulley K, is passed around the pulley L, and thence upward to the shaft B, or to the hook $a$ on the tie-beam $A^2$, to either of which it may be made fast, according as speed or power may be the desideratum. The sheave L may be attached to the vertically-moving and guided sash $M^1$, which carries a hoisting-platform, M, or said sheave may be held in a movable block or frame, having a hook for the attachment of that which is to be elevated. A weighted gravitating pawl, N, (one or more,) taking into the teeth of the rack H, serves to prevent the weight from descending during intervals of rest, or when the elevating power is withdrawn. To permit the descent of the rack and hoisting-platform, the pawl N is withdrawn from the rack by means of the cord $N^1$.

By reference to fig. 2 of the drawing it will be seen that, when in the act of hoisting, the descending rack H is projected below the upright $A^1$ in which it is guided, its downwardly-projected portion is susceptible of flexure, so that the sections $h$ may, as fast as they pass out of or below $A^1$, be directed horizontally, as represented, or allowed to fold one upon the other, or gather in a pile. Hence the rack H may be very long and capable of hoisting to great heights, and yet enable the frame to be built within compact and convenient compass. The flexible or sectional rack will be found especially advantageous when the apparatus is used in a cellar or lower apartment, where no provision for the descent of a rigid rack could be readily made.

The above-described apparatus supplies great power within a small compass, and is simple, cheap, and durable in construction.

Having described my invention, what I claim as new, and desire to secure by Letters Patent, is—

The combination of the frame A $A^1$ $A^2$, shaft B, pulleys D F J K, pinion G, cords or ropes E', rack H, either jointed or inflexible, and movable sheave L, all arranged and operating substantially as described.

To the above specification of my improved hoisting apparatus I have signed my hand this 26th day of September, A. D. 1867.

PHILIP HIGDON.

Witnesses:
 J. E. M. BOWEN,
 OCTAVIUS KNIGHT.